United States Patent
Pawlowska et al.

(10) Patent No.: US 8,114,936 B2
(45) Date of Patent: Feb. 14, 2012

(54) CATIONIC POLYMERS CONTAINING 2-HYDROXYALKYL-(METH)ACRYLATES AS PROMOTERS FOR ASA SIZING

(75) Inventors: Lucyna Pawlowska, Norwalk, CT (US); Robert Proverb, Woodbury, CT (US)

(73) Assignee: Kemira Oyj, Helsinki (FI)

( * ) Notice: Subject to any disclaimer, the term of this patent is extended or adjusted under 35 U.S.C. 154(b) by 0 days.

(21) Appl. No.: 13/081,084

(22) Filed: Apr. 6, 2011

(65) Prior Publication Data

US 2011/0201748 A1     Aug. 18, 2011

Related U.S. Application Data

(62) Division of application No. 11/570,734, filed as application No. PCT/US2005/013334 on Apr. 19, 2005, now abandoned.

(60) Provisional application No. 60/580,556, filed on Jun. 17, 2004.

(51) Int. Cl.
C08F 220/56 (2006.01)

(52) U.S. Cl. ............... 524/547; 524/555; 526/292.95; 526/303.1; 526/307.3; 526/307.5; 526/307.7; 526/317.1; 526/318.42; 526/320; 526/328.5

(58) Field of Classification Search ............ 526/292.95, 526/303.1, 307.3, 307.5, 307.7, 317.1, 317.42, 526/320, 328.5; 524/547, 555
See application file for complete search history.

(56) References Cited

U.S. PATENT DOCUMENTS

| | | | |
|---|---|---|---|
| 4,251,651 A | 2/1981 | Kawakami et al. | |
| 5,534,247 A | 7/1996 | Franjac et al. | |
| 5,567,277 A | 10/1996 | Elliott et al. | |
| 2004/0084162 A1 | 5/2004 | Shannon et al. | |

FOREIGN PATENT DOCUMENTS

| | | |
|---|---|---|
| EP | 0364175 A2 | 4/1990 |
| EP | 0735186 A2 | 10/1996 |
| JP | 2004-075784 | 3/2004 |
| WO | 0130951 A1 | 5/2001 |

OTHER PUBLICATIONS

International Search Report; International Application No. PCT/US2005/013334; date of mailing: Aug. 12, 2005.
JP02-008207; Publication Date: Jan. 11, 1990 (translation of abstract only).
JP04-370295; Publication Date: Dec. 22, 1992 (translation of abstract only).
Office Action—Final for U.S. Appl. No. 11/570,734; filed Jun. 17, 2007; First Named Inventor: Lucyna Pawlowska; Mail Date: Jan. 6, 2011.
Office Action—Non-Final for U.S. Appl. No. 11/570,734; filed Jun. 17, 2007; First Named Inventor: Lucyna Pawlowska; Mail Date: Aug. 4, 2010.
Office Action—Restriction/Election for U.S. Appl. No. 11/570,734, filed Jun. 17, 2007; First Named Inventor: Lucynma Pawlowska; Mail Date: Mar. 8, 2010.

*Primary Examiner* — Bernard Lipman
(74) *Attorney, Agent, or Firm* — Thomas, Kayden, Horstemeyer & Risley, LLP

(57) ABSTRACT

The invention relates to polymers useful as a papermaking additives. The invention also relates to methods for making and using such additives.

9 Claims, No Drawings

CATIONIC POLYMERS CONTAINING 2-HYDROXYALKYL-(METH)ACRYLATES AS PROMOTERS FOR ASA SIZING

CROSS REFERENCE TO RELATED APPLICATIONS

This application is a divisional of the legally related U.S. application Ser. No. 11/570,734, filed Jun. 17, 2007, now abandoned; which claims the benefits of the legally related 371 of PCT/US05/13334, filed Apr. 19, 2005; which claims the benefits of the legally related U.S. Provisional Patent Application Ser. No. 60/580,556, filed Jun. 17, 2004, which is fully incorporated herein by reference.

BACKGROUND

The present invention relates to polymers that are useful in paper additives.

"Sizing," as applied to paper, refers to a fibrous substrate's ability to resist wetting or penetration of a liquid into a paper sheet. Aqueous dispersions of alkenylsuccinic anhydride (ASA) cellulose-reactive sizing agent have been widely used in the paper and board making industry for many years, for sizing a wide variety of grades which include printing and writing grades and bleached and unbleached board grades. Cellulose-reactive alkenylsuccinic anhydride emulsions impart hydrophobic properties to the paper and board products.

Chemicals used to achieve sizing properties are known as either internal sizes or surface sizes. Internal sizes can be either rosin-based or synthetic sizes such as alkenylsuccinic anhydride, or other materials. Internal sizes are added to the paper pulp prior to sheet formation. Surface sizes are sizing agents that are added after the paper sheet has formed, most generally at the size press, although spraying applications may also be used.

A synthetic sizing agent such as alkenylsuccinic anhydride sizing agent is ordinarily applied by dispersing it in a cationic or amphoteric hydrophilic substance such as a starch or a polymer. The starch or polymer-dispersed alkenylsuccinic anhydride sizing emulsions have been added to the pulp slurry before the formation of a paper web. This type of addition of alkenylsuccinic anhydride sizing emulsions to the papermaking system is commonly called wet-end addition or internal addition of alkenylsuccinic anhydride.

Papermakers would benefit from a cationic or amphoteric polymer that is different from known polymers and, preferably, that also enhances the sizing efficiency of paper products. Unfortunately, known methods and compositions have prevented papermakers from achieving this goal. Known compositions and methods require an unduly large amount of materials to size paper products. Papermakers are under pressure to improve sizing efficiency and, as such, there is an ongoing need to develop products and methods that improve sizing efficiency.

For the foregoing reasons, there is a need to develop a paper additive that improves the sizing efficiency of paper products.

SUMMARY

The invention relates to a cationic polymer useful as a papermaking additive, which is obtained by copolymerizing:
(1) a vinyl monomer of the formula:

$$CH_2=CR_1-COA(CH_2)_nN^+R_2R_3X^- \quad (I)$$

$$\text{or } (CH_2=CHCH_2)_2N^+(R_2)_2X^- \quad (Ia)$$

wherein $R_1$ is a hydrogen atom or a methyl group, A is an oxygen atom or NH group, n is 2 or 3, $R_2$ and $R_3$ are each a methyl group or an ethyl group and X is a chlorine atom, a bromine atom, or $X^-$ is a methyl sulfate ion; and
(2) a vinyl monomer of the formula:

$$CH_2=CR_4-CONH_2 \quad (II)$$

wherein $R_4$ is a hydrogen atom or a methyl group; and
(3) a vinyl monomer of the formula:

$$CH_2=CR_5COO(CH_2)_nOH \quad (III) \text{ or}$$

$$CH_2=CR_6COO(CH_2)_mCH(OH)CH_2OH \quad (IIIa)$$

wherein $R_5$ and $R_6$ is a hydrogen atom or a methyl group, n is 1-4, inclusive and m is 1 or 2.

In another embodiment, the invention relates to an amphoteric polymer useful as a papermaking additive, which is obtained by copolymerizing (1) a vinyl monomer of the formula:

$$CH_2=CR_1-COA(CH_2)_nN^+R_2R_3X^- \quad (I)$$

$$\text{or } (CH_2=CHCH_2)_2N^+(R_2)_2X^- \quad (Ia)$$

wherein $R_1$ is a hydrogen atom or a methyl group, A is an oxygen atom or NH group, n is 2 or 3, $R_2$ and $R_3$ are each a methyl group or an ethyl group and X is a chlorine atom, a bromine atom, or $X^-$ is a methyl sulfate ion; and
(2) a vinyl monomer of the formula:

$$CH_2=CR_4-CONH_2 \quad (II)$$

wherein $R_4$ is a hydrogen atom or a methyl group, and
(3) a vinyl monomer of the formula:

$$CH_2=CR_5COO(CH_2)_nOH \quad (III)$$

$$\text{or } CH_2=CR_6COO(CH_2)_mCHOHCH_2OH \quad (IIIa)$$

wherein $R_5$ and $R_6$ is a hydrogen atom or a methyl group and n is 1 or 4 and m is 1 or 2; and
(4) an anionic vinyl monomer of the formula:

$$CH_2=CR_7COOR_8 \quad (IV)$$

wherein $R_7$ is a hydrogen atom or a methyl group, and $R_8$ is a hydrogen atom, an alkali metal, ammonium group.

In another embodiment, the invention relates to a method for making the cationic polymer or a method for making the amphoteric polymer.

In another embodiment, the invention relates to a method comprising (a) providing paper stock; (b) adding to the paper stock a composition comprising: (i) synthetic sizing agent, and (ii) the above described cationic polymer or amphoteric polymer, and (c) forming a web from said paper stock, such that the web exhibits an improved sizing efficiency as compared to a web made without the cationic polymer.

These and other features, aspects, and advantages of the present invention will become better understood with reference to the following description and appended claims.

DESCRIPTION

The invention is based on the remarkable discovery that by using a certain cationic polymer or amphoteric polymer, it is now possible to enhance the sizing efficiency of a paper product.

Other than in the operating examples or where otherwise indicated, all numbers or expressions referring to quantities of ingredients, reaction conditions, etc., used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

The term "paper", as used herein, is meant to include fibrous substrates that include not only paper as the term is commonly used but all types of cellulose-based products in sheet and web form, including, for example, board and paperboard. The sizing compositions may be added to any stock containing cellulosic fibres, optionally in combination with mineral fillers, and usually the content of cellulosic fibres is at least 50% by weight, based on dry stock. Examples of mineral fillers of conventional types include kaolin, china clay, titanium dioxide, gypsum, talc and natural and synthetic calcium carbonates such as chalk, ground marble and precipitated calcium carbonate.

A cationic polymer of the invention is obtained by copolymerizing (1) a vinyl monomer of the formula:

$$CH_2=CR_1-COA(CH_2)_nN^+R_2R_3X^- \quad (I)$$

$$or\ (CH_2=CHCH_2)_2N^+(R_2)_2X^- \quad (Ia)$$

wherein $R_1$ is a hydrogen atom or a methyl group, A is an oxygen atom or NH group, n is 2 or 3, $R_2$ and $R_3$ are each a methyl group or an ethyl group and X is a chlorine atom, a bromine atom, or $X^-$ is a methyl sulfate ion; and (2) a vinyl monomer of the formula:

$$CH_2=CR_4-CONH_2 \quad (II)$$

wherein $R_4$ is a hydrogen atom or a methyl group; and
(3) a vinyl monomer of the formula:

$$CH_2=CR_5COO(CH_2)_nOH \quad (III)\ or$$

$$CH_2=CR_6COO(CH_2)_mCHOHCH_2OH \quad (IIIa)$$

wherein $R_5$ and $R_6$ is a hydrogen atom or a methyl group, n is 1-4, inclusive and m is 1 or 2.

The synthetic sizing agent may be any sizing agent that can imparts desired sizing properties. Preferred sizing agents include alkenyl succinic anhydride (ASA) and alkyl ketene dimer (AKD), and alkeno ketene dimer, alkyl isocyanates, and alkyl anhydrides.

The vinyl monomer (I) may be a quaternary ammonium group-containing vinyl monomer produced by quaternizing a dialkylaminoalkyl ester of acrylic acid or methacrylic acid with an alkyl halide or alkyl sulfate. Specific examples of the vinyl monomer (I) include quaternized products resulting from dimethylaminoethyl acrylate, diethylaminoethyl acrylate, dimethylaminoethyl methacrylate, diethylaminoethyl methacrylate, etc. As the quaternizing agent, there may be exemplified methyl chloride, methyl bromide, methyl iodide, ethyl bromide, etc.

The vinyl monomer (Ia) may include diallyldimethylammonium chloride.

The vinyl monomer (II) includes acrylamide and methacrylamide. These monomers are effective in increasing the molecular weight of the resulting polymer due to its high polymerizability. They are also effective in improving the water solubility of the produced polymer.

The vinyl monomer (III) may include hydroxymethyl (meth)acrylate, 2-hydroxyethyl(meth)acrylate, hydroxypropyl(meth)acrylate and hydroxybutyl (meth)acrylate.

The vinyl monomer (IIIa) may include 2,3-dihydroxypropyl (meth)acrylate and 3,4-dihydroxybutyl(meth)acrylate.

The cationic charge of the cationic polymer ranges from at least 1 to 99 mole %.

In one embodiment, the cationic polymer has a 2-hydroxyethyl methacrylate ranging from 1 to 30 mole percent. In another embodiment, the cationic polymer has a 2-hydroxyethyl methacrylate ranging from 2 to 20 mole percent. In another embodiment, the cationic polymer has a 2-hydroxyethyl methacrylate ranging from 5 to 10 mole percent.

Although not required, the cationic polymer can be crosslinked or branched.

The amphoteric polymer of the invention is generally obtained by copolymerizing:

(1) a vinyl monomer of the formula:

$$CH_2=CR_1-COA(CH_2)_nN^+R_2R_3X^- \quad (I)$$

$$or\ (CH_2=CHCH_2)_2N^+(R_2)_2X^-$$

wherein $R_1$ is a hydrogen atom or a methyl group, A is an oxygen atom or NH group, n is 2 or 3, $R_2$ and $R_3$ are each a methyl group or an ethyl group and X is a chlorine atom, a bromine atom, or $X^-$ is a methyl sulfate ion; and (2) a vinyl monomer of the formula:

$$CH_2=CR_4-CONH_2 \quad (II)$$

wherein $R_4$ is a hydrogen atom or a methyl group, and
(3) a vinyl monomer of the formula:

$$CH_2=CR_6COO(CH_2)_nOH \quad (III)$$

$$or\ CH_2=CR_6COO(CH_2)_mCHOHCH_2OH \quad (IIIa)$$

wherein $R_5$ and $R_6$ is a hydrogen atom or a methyl group and n is 1 or 4 and m is 1 or 2; and (4) an anionic vinyl monomer of the formula:

$$CH_2=CR_7COOR_8 \quad (IV)$$

wherein $R_7$ is a hydrogen atom or a methyl group, and $R_8$ is a hydrogen atom, an alkali metal, ammonium group.

The anionic vinyl monomer (IV) may include acrylic acid or methacrylic acid.

The amphoteric polymer preferably has an anionic charge ranging from 0 to 40 mole percent.

The molecular weight of the cationic polymer or amphoteric polymer varies, depending on the needs at hand. In one embodiment, the cationic polymer or amphoteric polymer has a molecular weight ranging from 10,000 to 3,000,000 daltons average molecular weight. In another embodiment, the cationic polymer or amphoteric polymer has a molecular weight ranging from 100,000 to 2,000,000 daltons average molecular weight. In another embodiment, the cationic polymer or amphoteric polymer has a molecular weight ranging from 100,000 to 1,000,000 daltons average molecular weight. Molecular weights stated herein are weight average.

The proportion of the vinyl monomers to be copolymerized may be varied depending on the desired properties of the resulting polymer, the kinds of monomers used, the polymerization mode to be adopted, etc. But, the molar proportion of the vinyl monomers (I), (II), (III) and (IV) is usually about 1 to 99:1 to 99:1 to 30:0 to 40, or about 1 to 10:1 to 85:2 to 10:0 to 5

The copolymerization of the vinyl monomers may be carried out in an aqueous medium in the presence of a catalyst by a per se conventional procedure such as solution polymerization, emulsion polymerization or precipitation polymerization.

In case of solution polymerization, there may be employed as the reaction medium water, a lower alcohol or their mixture, among which the use of water is particularly preferred. The total concentration of the vinyl monomers in the aqueous medium may be from about 5 to 80% by weight. Depending on the total concentration or composition of the vinyl monomers, the polymer is produced in a form ranging from a fluidizable liquid to a non-fluidizable solid. When the product is a liquid, it may be used as such. When the product is a solid, it may be crushed, if necessary, followed by drying to give a powdery material.

In use, the invention provides valuable methods. In one embodiment, the invention relates to a method that includes the steps of (a) providing paper stock; (b) adding to the paper stock a composition comprising: (i) synthetic sizing agent, and (ii) a cationic polymer useful as a paper additive obtained by copolymerizing:

(1) a vinyl monomer of the formula:

$$CH_2=CR_1-COA(CH_2)_nN^+R_2R_3X^- \quad (I)$$

$$\text{or } (CH_2=CHCH_2)_2N^+(R_2)_2X^-$$

wherein $R_1$ is a hydrogen atom or a methyl group, A is an oxygen atom or NH group, n is 2 or 3, $R_2$ and $R_3$ are each a methyl group or an ethyl group and X is a chlorine atom, a bromine atom, or $X^-$ is a methyl sulfate ion; and (2) a vinyl monomer of the formula:

$$CH_2=CR_4-CONH_2 \quad (II)$$

wherein $R_4$ is a hydrogen atom or a methyl group, and (3) a vinyl monomer of the formula:

$$CH_2=CR_5COO(CH_2)_nOH \quad (III)$$

$$\text{or } CH_2=CR_6COO(CH_2)_mCHOHCH_2OH$$

wherein $R_5$ and $R_6$ is a hydrogen atom or a methyl group and n is 1-4, inclusive and m is 1 or 2. (iii) water or starch solution, and (c) forming a web from said paper stock, such that the web exhibits an improved sizing efficiency as compared to a web made without the cationic polymer.

When the amphoteric polymer of the invention is used, the invention provides a method that includes the steps of (a) providing paper stock; (b) adding to the paper stock a composition comprising: (i) a synthetic sizing agent, and (ii) the amphoteric polymer useful as a paper additive, which is obtained by copolymerizing (1) a vinyl monomer of the formula:

$$CH_2=CR_1-COA(CH_2)_nN^+R_2R_3X^- \quad (I)$$

$$\text{Or } (CH_2=CHCH_2)_2N^+(R_2)_2X^-$$

wherein $R_1$ is a hydrogen atom or a methyl group, A is an oxygen atom or NH group, n is 2 or 3, $R_2$ and $R_3$ are each a methyl group or an ethyl group and X is a chlorine atom, a bromine atom, or $X^-$ is a methyl sulfate ion; and (2) a vinyl monomer of the formula:

$$CH_2=CR_4-CONH_2 \quad (II)$$

wherein $R_4$ is a hydrogen atom or a methyl group, and (3) a vinyl monomer of the formula:

$$CH_2=CR_5COO(CH_2)_nOH \quad (III)$$

$$\text{or } CH_2=CR_6COO(CH_2)_mCHOHCH_2OH \quad (IIIa)$$

wherein $R_5$ and $R_6$ is a hydrogen atom or a methyl group and n is 1 or 4 and m is 1 or 2.

(4) an anionic vinyl monomer of the formula:

$$CH_2=CR_7COOR_8 \quad (IV)$$

wherein $R_7$ is a hydrogen atom or a methyl group, and $R_8$ is a hydrogen atom, an alkali metal, ammonium group;

(iii) water or starch solution, and (c) forming a web from said paper stock, such that the web exhibits an improved sizing efficiency as compared
to a web made without the amphoteric polymer.

When a polymer of the invention is added to the surface of paper, the invention provides a method that involves the steps of (a) providing paper stock; (b) forming a web from said paper stock, (c) adding to the web a composition cationic polymer or the amphoteric polymer. Such a polymer is added to the surface of a fibrous substrate by any suitable means, e.g., by size press application, spraying and/or water box application.

In the embodiment in which the surface of paper is treated, anionic or non-ionic polymers may also be used. In this embodiment, non-ionic polymers are obtained by copolymerizing vinyl monomers of formulae (II) and (III) and/or (IIIa). Anionic polymers can obtained by copolymerizing monomers of formula (II), and (III), and/or (IIIa), and (IV).

The synthetic sizing agent can be applied in various amounts. For instance, the synthetic sizing agent is generally applied at a dosage ranging from 0.1 kg/metric ton to 10 kg/metric ton, or 0.5 to 5, or from 1 to 4. In one embodiment, the synthetic sizing agent:polymer is added to the paper stock at weight ratios that enable the resulting web to exhibit an improved sizing efficiency as compared to a web made without the cationic polymer. In one embodiment, the synthetic sizing agent:polymer is added at a weight ratio ranging from 1:0.05 to 1:1. In another embodiment, the synthetic sizing agent:polymer is added at a weight ratio ranging from 1:0.1 to 1:0.5. In another embodiment, the synthetic sizing agent:polymer is added at a weight ratio ranging from 1:0.1 to 1:0.2.

The synthetic sizing agent can also be added in various forms. In one embodiment, the synthetic sizing agent is emulsified with a polymer. In another embodiment, the sizing agent is emulsified with water and surfactants. In another embodiment, the sizing agent is emulsified in starch.

In one embodiment, for instance, the synthetic sizing agent is added as a sizing emulsion containing a surfactant and the emulsion is prepared under low shear conditions, e.g. those shearing conditions are created by a device selected from the group of centrifugal pumps, static in-line mixers, peristaltic pumps, magnetic stirring bar in a beaker, overhead stirrer, and combinations thereof. In another embodiment, the synthetic sizing agent is added as a sizing emulsion containing surfactant and the emulsion is prepared under high shear conditions.

Examples of suitable surfactants include but are not limited to alkyl and aryl primary, secondary and tertiary amines and their corresponding quaternary salts, sulfosuccinates, fatty acids, ethoxylated fatty acids, fatty alcohols, ethoxylated fatty alcohols, fatty esters, ethoxylated fatty esters, ethoxylated triglycerides, sulfonated amides, sulfonated amines, ethoxylated polymers, propoxylated polymers or ethoxylated/propoxylated copolymers, polyethylene glycols, phosphate esters, phosphonated fatty acid ethoxylates, phosphonated fatty alcohol ethoxylates, and alkyl and aryl sulfonates and sulfates. Examples of preferred suitable surfactants include but are not limited to amides; ethoxylated polymers, propoxylated polymers or ethoxylated/propoxylated copolymers; fatty alcohols, ethoxylated fatty alcohols, fatty esters, carboxylated alcohol or alkylphenol ethoxylates; carboxylic acids; fatty acids; diphenyl sulfonate derivatives; ethoxylated alcohols; ethoxylated fatty alcohols; ethoxylated alkylphenols; ethoxylated amines; ethoxylated amides; ethoxylated aryl phenols; ethoxylated fatty acids; ethoxylated triglycerides; ethoxylated fatty esters; ethoxylated glycol esters; polyethylene glycols; fatty acid esters; glycerol esters; glycol esters; certain lanolin-based derivatives; monoglycerides, diglycerides and derivatives; olefin sulfonates; phosphate esters; phosphorus organic derivatives; phosphonated fatty acid ethoxylates, phosphonated fatty alcohol ethoxylates; polyethylene glycols; polymeric polysaccharides; propoxylated and ethoxylated fatty acids; alkyl and aryl sulfates and sulfonates; ethoxylated alkylphenols; sulfosuccinamates; sulfosuccinates.

In one embodiment, the surfactant component includes an amine selected from the group consisting of trialkyl amine of the formula (I):

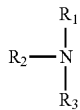

dimethyl sulfate quaternary salt of trialkyl amine of the formula (I), benzyl chloride quaternary salt of trialkyl amine of the formula (I), and diethyl sulfate quaternary salt of trialkyl amine of the formula (I), in which $R_1$ is methyl or ethyl, $R_2$ is methyl or ethyl, and $R_3$ is alkyl having 14 to 24 carbon atoms. In another embodiment, the surfactant excludes this amine.

The surfactant levels can range from about 0.1 weight % up to about 20 weight % based on the alkenylsuccinic anhydride component.

The order in which the synthetic sizing agent is added can vary. In one embodiment, the synthetic sizing agent is added in conjunction with the cationic polymer.

The sizing efficiency improvement provided by the method can be determined by various methods. For instance, the sizing efficiency: resistance of water to paper increase measurements can be determined by the ink penetration test or the Cobb test.

The sizing efficiency improvement can range from 10 to 200 percent more, as compared to when the paper is prepared without the polymer.

The paper made with a method of the invention has favorable qualities. In one embodiment, the paper has a ink penetration ranging from 50 to 1500 seconds. In another embodiment, the paper has a cobb value ranging from 15 to 200 grams/m2

The invention is further described in the following illustrative examples in which all parts and percentages are by weight unless otherwise indicated.

EXAMPLES

Example 1

Comparative

A low molecular weight 90/10 mole % acrylamide/[2-(methyl-acryloyloxy)ethyl]trimethylammonium chloride copolymer (AMD/Q6) was prepared by a free radical co-polymerization. The polymerization process was carried out by simultaneous, continuous addition of ammonium persulfate and monomer solutions to a reaction vessel that contained deionized water and chelating agent buffered with malic acid. The monomer solution was prepared by mixing 45.62 parts of 52.96% acrylamide solution, 10.45 parts of 75% Q6 solution, 2.4 parts of 2% sodium hypophosphite solution, and 53.93 parts of deionized water. The pH of the monomer solution was adjusted from 4.14 to 3.78 with a 20% solution of malic acid. The monomer solution was sparged with nitrogen for an hour before addition. The reactor vessel solution was prepared by addition of 278.46 parts of deionized water and 0.27 parts of 40% pentasodium diethylenepentaacetate. The pH of the reactor vessel solution was adjusted from 10.63 to 3.76 with 0.57 parts of 20% malic acid solution. The latter solution was sparged with nitrogen for an hour.

The initiator solution was prepared by addition of 0.38 parts of ammonium persulfate into 7.87 parts of deionized water. This solution was sparged with nitrogen for half an hour just prior to use. The addition of monomer solution and ammonium persulfate solution to the reactor vessel was carried out over 2.25 hr and 2.5 hr, respectively. The polymerization reaction was performed at 65° C. The reaction solution was maintained under the nitrogen purge throughout the course of reaction.

The pH of the final product was equal to 3.1, bulk viscosity was equal to 90 cP (measured using Brookfield viscometer model DV-III, #3 spindle, 12 rpm, at 25° C.) and viscosity of a 2% polymer solution was equal to 12 cP (measured using Brookfield viscometer model DV-III, #2 spindle, 30 rpm, at 25° C.). Molecular weight of this polymer (Mw) is equal to 227,000 daltons.

Example 2

A low molecular weight 90/10/5 mole % acrylamide/[2-(methylacryloyloxy)ethyl]trimethylammonium chloride/2-hydroxyethy methacrylate (AMD/Q6/HEMA) terpolymer was prepared by a free radical co-polymerization. The polymerization process was carried out by simultaneous, continuous addition of ammonium persulfate and monomer solutions to a reaction vessel that contained deionized water and chelating agent buffered with malic acid. The monomer solution was prepared by mixing 41.64 parts of 52.96% acrylamide solution, 10.11 parts of 75% Q6 solution, 2.44 parts of 97% HEMA solution, 2.4 parts of 2% sodium hypophosphite solution, and 55.86 parts of deionized water. The pH of this solution was equal to 3.82. The monomer solution was sparged with nitrogen for an hour before addition. The reactor vessel solution was prepared by mixing 278.27 parts of deionized water and 0.27 parts of 40% pentasodium diethylenepentaacetate. The pH of the reactor vessel solution was adjusted from 10.47 to 3.63 with 0.76 parts of 20% malic acid solution. The latter solution was sparged with nitrogen for an hour just prior to use. The initiator solution was prepared by addition of 0.38 parts of ammonium persulfate into 7.87 parts of deionized water. This solution was sparged with nitrogen for half an hour prior to use. The addition of monomer solution and ammonium persulfate solution to the reactor vessel was carried out over 2.25 hr and 2.5 hr, respectively. The polymerization reaction was performed at 65° C. The reaction solution was maintained under the nitrogen purge throughout the course of reaction.

The pH of final product was equal to 3.1, bulk viscosity was equal to 70 cP (measured using Brookfield viscometer model DV-III, #3 spindle, 12 rpm, at 25° C.) and viscosity of a 2% polymer solution was equal to 11 cP (measured using Brookfield viscometer model DV-III, #2 spindle, 30 rpm, at 25° C.). Molecular weight of this polymer (Mw) is equal to 257,000 daltons.

Example 3

Evaluation of polymers from Example 1 and 2 was done by preparation of ASA emulsions with these polymers, characterization of the emulsion particle size distribution (Table 1), addition of these emulsions to the paper slurry, forming paper handsheets and measuring handsheets sizing (Table 2).

Emulsification of ASA using Polymers

Alkenyl succinic anhydride (ASA) emulsions were prepared with polymers from example 1 and 2 at a 1/0.1 ASA/polymer ratio. Concentration of ASA during the emulsification was equal to 3.85 wt. %. ASA emulsions were prepared by following procedure:

Solution of each polymer was prepared at 0.4-wt. % concentration on real basis using DI water.

96.15 g of a polymer solution was placed in a small stainless steel blender jar, and the blender was started at a low speed.

While mixing, 3.85 g of ASA was added to a polymer solution by the means of plastic syringe. The speed of blender was immediately changed from low to high and the timer was started.

The emulsification was carried out for 3 min at a high speed.

The emulsion particle size was measured using Particle Size Analyzer Horiba LA 700.

A solution of 0.25 wt. % ASA concentration was prepared using deionized water adjusted with dilute hydrochloric acid to pH 3.

The emulsion was placed in ice water and immediately used for handsheet preparation.

Handsheet Preparation Process

Handsheets were prepared using a furnish of a 50/50 mixture of bleached hardwood and softwood kraft pulp refined to a Canadian Standard Freeness of 500 to which 15% by weight of precipitated calcium carbonate was added, and pH was adjusted to 7.8.

Deionized water was used for furnish preparation, and additional 80 ppm of sodium sulfate and 50 ppm of calcium chloride were added.

While mixing, a batch of 0.71% solids containing 10 g of cellulose fibers and calcium carbonate was treated with an ASA emulsion. After 60-sec contact time, an anionic retention aid was added and mixing continued for 15 sec. Three 2.8-g sheets of paper were formed using Standard (8"×8") Nobel & Woods handsheet mold, to target basis weight of 50 lb/Tappi Ream, pressed between felts in the nip of a pneumatic roll press at about 15 psi and dried on the rotary dryer at 240° F. The dose of 3 lb/T of ASA and 1 lb/T of an anionic retention aid were applied.

Evaluation of Paper Sizing

The sizing of handsheets was tested using Bayer Ink Penetration test (BIP).

The BIP size testing method provides a fully automated application of ink to the under surface of the paper together with automatic measurement of the optical end point. This method uses the same principle as the TAPPI T 530 test but uses an instrument of our design, which provides an automated design and different geometry for light sources and detector. In particular, all steps of the BIP test were performed automatically with this apparatus. On the push of a start button, ink was pumped into a well until the ink contacted the under surface of the paper, determined electronically, and the timing of the ink penetration was obtained from a reflectance measurement and was displayed digitally. Neutral ink buffered to pH 7.0 was used in all BIP testing and was prepared by dissolving 12.5 g of naphthol green B dye in 500 mL of deionized water, and a pH 7 buffer solution was then added to bring the total volume to 1000 mL at 23° C.

Handsheets were evaluated by the BIP test after a conditioning period of at least one day at 72 F and 50% relative humidity. Three handsheet specimens were tested, with two repetitions on each felt side, for a total of six tests.

To begin a BIP test, each paper specimen was inserted into the apparatus. A fiber optic source cable provided uniform illumination of the topside of the specimen.

A detector fiber optic cable viewed the same area of illumination. The initial reflectance of the specimen was determined automatically and stored for reference. The test ink was automatically metered by a metering pump from a reservoir into the bottom of a cone-shaped ink well until the ink contacted the underside of the paper specimen under test, at which time a timer was started electronically. The change in reflectance was periodically monitored automatically and the timer was stopped when a pre-specified percentage decrease in reflectance was reached. This decrease was about 20%, i.e., the specimen retained about 80% of its initial reflectance. The elapsed time of the test was displayed and recorded to the nearest second. Then a drain pump was started automatically and run for a period of time long enough to empty the ink in the well into a waste reservoir. The average test time for the three specimens on the felt side were calculated.

TABLE 1

ASA Emulsion Particle Size Distribution

| Polymer ID | ASA/Polymer Ratio | Median Particle Size (microns) | Percent of Particles Under 1 micron (%) | Size Under Which Are 90% of Particles (micron) | Particle Size Distribution Graph |
|---|---|---|---|---|---|
| Example 1 | 1/0.1 | 0.631 | 72.6 | 1.771 | Normal with shoulder |
| Example 2 | 1/0.1 | 0.490 | 95.8 | 0.835 | Normal |

TABLE 2

Sizing Efficiency of ASA Emulsion

| Polymer ID | Polymer Description | ASA/Polymer Ratio | Sizing (sec) 3 lb/T ASA |
|---|---|---|---|
| Example 1 | Low MW Copolymer | 1/0.1 | 146 |
| Example 2 | Low MW Terpolymer | 1/0.1 | 290 |

In Table 1 it is shown that ASA emulsion prepared with a polymer from Example 2 has smaller median particle size and narrower particle size distribution. In Table 2 it is shown that ASA emulsion prepared with polymer from Example 2 provides higher sizing than ASA emulsion prepared with a polymer from Example 1.

Example 4

A low molecular weight 90/10/5/4 mole % acrylamide/[2-(methylacryloyloxy)ethyl]trimethylammonium chloride/2-hydroxyethy methacrylate/acrylic acid (AMD/Q6/HEMA/AA) tetrapolymer was prepared by a free radical co-polymerization. The polymerization process was carried out by simultaneous, continuous addition of ammonium persulfate and monomer solutions to a reaction vessel that contained deionized water and chelating agent buffered with malic acid. The monomer solution was prepared by mixing 99.13 parts of 52.96% acrylamide solution, 25.28 parts of 75% Q6 solution, 6.11 parts of 97% HEMA solution, 2.66 parts of 99% acrylic acid solution, 5.0 parts of 4% sodium hypophosphite solution, and 10.32 parts of deionized water. The pH of this solution was equal to 2.12. The monomer solution was sparged with nitrogen for an hour before addition. The reactor vessel solution was prepared by mixing 242.7 parts of deionized water and 0.27 parts of 40% pentasodium diethylenepentaacetate. The pH of the reactor vessel solution was adjusted from 10.69 to 4.53 with 0.28 parts of 20% malic acid solution. The latter solution was sparged with nitrogen for an hour prior to use. The initiator solution was prepared by addition of 0.96 parts of ammonium persulfate into 7.28 parts of deionized water. This solution was sparged with nitrogen for half an hour prior to use. The addition of monomer solution and ammonium persulfate solution to the reactor vessel was carried out over 2.25 hr and 2.5 hr, respectively. The polymerization reaction was performed at 65° C. The reaction solution was maintained under the nitrogen purge throughout the course of reaction.

The pH of final product was equal to 2.03, bulk viscosity was equal to 2310 cP (measured using Brookfield viscometer model DV-III, #3 spindle, 12 rpm, at 25° C.) and viscosity of a 2% polymer solution was equal to 7.0 cP (measured using Brookfield viscometer model DV-III, #2 spindle, 30 rpm, at 25° C.). Molecular weight of this polymer (Mw) is equal to 212,000 daltons.

Example 5

ASA emulsions were prepared with polymers from Examples 1, 2 and 4 at a 1/0.2 ASA/polymer ratio. Concentration of ASA during the emulsification was equal to 3.85 wt. %. ASA emulsions were prepared by the procedure described in Example 3 except that 0.8% polymer solution was used for emulsification. Handsheets were made and tested as it was described in Example 3.

that ASA emulsified with polymers from Example 2 and 4 provides higher sizing than ASA emulsified with a polymer from Example 1.

Example 6

ASA emulsion is prepared with a polymer from Example 4 at an ASA/polymer ratio of 1/0.2 and 1/1. These emulsions were compared to ASA emulsions prepared with conventional cationic starch at ASA/starch ratios of 1/0.2 and 1/1.

Emulsions were prepared as described in Example 3, except that a 0.8 wt. % polymer or starch solution was used to make an emulsion at 1/0.2 ASA/emulsifier ratio, and a 4 wt % solution of polymer or starch was used to make an emulsion at 1/1 ASA/emulsifier ratio. Stability of emulsions was checked after 2 hrs.

Handsheets were made and tested as it was described in Example 3.

TABLE 3

ASA Emulsion Particle Size Distribution

| Polymer ID | ASA/Polymer Ratio | Median Particle Size (microns) | Percent of Particles Under 1 micron (%) | Size Under Which Are 90% of Particles (micron) | Particle Size Distribution Graph |
|---|---|---|---|---|---|
| Example 1 (comparative) | 1/0.2 | 0.589 | 73.0 | 2.062 | Normal with shoulder |
| Example 2 | 1/0.2 | 0.509 | 86.0 | 1.210 | Normal |
| Example 4 | 1/0.2 | 0.550 | 81.2 | 1.032 | Normal |

TABLE 4

Sizing Efficiency of ASA Emulsion (Example 1, 2 and 3)

| Polymer ID | Polymer Description | ASA/Polymer Ratio | Sizing (sec) 3 lb/T ASA |
|---|---|---|---|
| Example 1 (comparative) | Low MW Copolymer | 1/0.2 | 440 |
| Example 2 | Low MW Terpolymer | 1/0.2 | 560 |
| Example 4 | Low MW Tetrapolymer | 1/0.2 | 495 |

In Table 3 it is shown that ASA emulsions prepared with a polymer from Example 2 and 4 have smaller median particle size and narrower particle size distribution than ASA emulsion prepared with a polymer from Example 1. Table 4 shows

TABLE 5

ASA Emulsion Particle Size Distribution

| Polymer ID | ASA/Polymer Ratio | Median Particle Size (microns) | Percent of Particles Under 1 micron (%) | Size Under Which Are 90% of Particles (micron) | Particle Size Distribution Graph | Emulsion After 2 hr |
|---|---|---|---|---|---|---|
| Example 4 | 1/0.2 | 0.599 | 81.2 | 1.363 | Normal | No change |
| Example 4 | 1/1 | 0.55 | 89.5 | 1.032 | Normal | No change |
| Starch | 1/0.2 | 10.498 | 15.6 | 19.170 | Bimodal | Separated |
| Starch | 1/1 | 0.614 | 84.7 | 1.143 | Normal | Agglomerated |

TABLE 6

Sizing Efficiency of ASA Emulsion (Example 3 and Starch)

| Polymer ID | ASA/Polymer Ratio | Sizing (sec) 3 lb/T ASA |
|---|---|---|
| Example 4 | 1/0.2 | 495 |
| Example 4 | 1/1 | 733 |
| Starch | 1/0.2 | 0 |
| Starch | 1/1 | 1005 |

At a 1/0.2 ASA/polymer ratio, ASA emulsion prepared with polymer from Example 4 has small median particle, narrow particle size distribution and is stable for at least two hours. This emulsion provides sizing of paper.

At the ratio of 1/0.2 ASA/starch, ASA emulsion has large median particle size, bimodal distribution and separates within 30 min. This emulsion doesn't provide sizing.

At the ratio of 1/1 of ASA/polymer and ASA/starch, ASA emulsions prepared with polymer and with starch have small median particle size and narrow particle size distribution, however ASA/starch emulsion is not useable after 2 hour, while ASA/polymer emulsion is not changed for at least two hours.

At 1/1 ratio, ASA emulsion prepared with starch outperforms emulsion prepared with polymer.

Example 7

Comparative

A high molecular weight 90/10 mole % acrylamide/[2-(methylacryloyloxy)ethyl]trimethylammonium chloride copolymer (AMD/Q6) was prepared by a free radical co-polymerization. The polymerization process was carried out by simultaneous, continuous addition of ammonium persulfate and monomer solutions to a reaction vessel that contained deionized water and chelating agent buffered with malic acid. The monomer solution was prepared by mixing 45.62 parts of 52.96% acrylamide solution, 10.45 parts of 75% Q6 solution, and 56.30 parts of deionized water. The pH of the monomer solution was adjusted from 4.1 to 3.7 with 0.08 parts of 20% solution of malic acid. The monomer solution was sparged with nitrogen for an hour prior to addition. The reactor vessel solution was prepared by mixing 278.41 parts of deionized water and 0.27 parts of 40% pentasodium diethylenepentaacetate. The pH of the reactor vessel solution was adjusted from 10.8 to 3.8 with 0.62 parts of 20% malic acid solution. The latter solution was sparged with nitrogen for an hour prior to addition.

The initiator solution was prepared by addition of 0.22 parts of ammonium persulfate into 8.03 parts of deionized water. This solution was sparged with nitrogen for half an hour prior to use. The addition of monomer solution and ammonium persulfate solution to the reactor vessel was carried out over 2.25 hr and 2.5 hr, respectively. The polymerization reaction was performed at 65° C. The reaction solution was maintained under the nitrogen purge throughout the course of reaction.

The pH of final product was equal to 3.05, bulk viscosity was equal to 2389 cP (measured using Brookfield viscometer model DV-III, #3 spindle, 12 rpm, at 25° C.) and viscosity of a 2% polymer solution was equal to 62 cP (measured using Brookfield viscometer model DV-III, #2 spindle, 30 rpm, at 25° C.). Molecular weight of this polymer (Mw) is equal to 1,000,000 daltons.

Example 8

A high molecular weight 90/10/5 mole % acrylamide/[2-(methylacryloyloxy)ethyl]trimethylammonium chloride/2-hydroxyethy methacrylate (AMD/Q6/HEMA) terpolymer was prepared by a free radical copolymerization. The polymerization process was carried out by simultaneous, continuous addition of ammonium persulfate and monomer solutions to a reaction vessel that contained deionized water and chelating agent buffered with malic acid. The monomer solution was prepared by mixing 41.64 parts of 52.96% acrylamide solution, 10.11 parts of 75% Q6 solution, 2.44 parts of 97% HEMA solution, and 58.26 parts of deionized water. The pH of this solution was equal to 3.62. The monomer solution was sparged with nitrogen for an hour before addition. The reactor vessel solution was prepared by mixing 278.30 parts of deionized water and 0.27 parts of 40% pentasodium diethylenepentaacetate. The pH of the reactor vessel solution was adjusted from 10.87 to 3.81 with 0.73 parts of 20% malic acid solution. The latter solution was sparged with nitrogen for an hour prior to use.

The initiator solution was prepared by addition of 0.26 parts of ammonium persulfate into 7.99 parts of deionized water. This solution was sparged with nitrogen for half an hour prior to use. The addition of monomer solution and ammonium persulfate solution to the reactor vessel was carried out over 2.25 hr and 2.5 hr, respectively. The polymerization reaction was performed at 65° C. The reaction solution was maintained under the nitrogen purge throughout the course of reaction.

The pH of final product was equal to 3.16, bulk viscosity was equal to 1400 cP (measured using Brookfield viscometer model DV-III, #3 spindle, 12 rpm, at 25° C.) and viscosity of a 2% polymer solution was equal to 50 cP (measured using Brookfield viscometer model DV-III, #2 spindle, 30 rpm, at 25° C.). Molecular weight of this polymer (Mw) is equal to 1,050,000 daltons.

Example 9

ASA emulsions were prepared with polymers from Examples 7 and 8 at a 1/0.1 ASA/polymer ratio. Concentration of ASA during the emulsification was equal to 3.85 wt. %. ASA emulsions were prepared, and handsheets were made and tested as it was described in Example 3.

TABLE 7

ASA Emulsion Particle Size Distribution

| Polymer ID | ASA/Polymer Ratio | Median Size Particle (microns) | Percent of Particles Under 1 micron (%) | Size Under Which Are 90% of Particles (micron) |
|---|---|---|---|---|
| Example 7 (comparative) | 1/0.1 | 1.192 | 43.4 | 2.913 |
| Example 8 | 1/0.1 | 0.773 | 59.8 | 2.412 |

TABLE 8

Sizing Efficiency of ASA Emulsion

| Polymer ID | Polymer Description | ASA/Polymer Ratio | Sizing (sec) 3 lb/T ASA |
|---|---|---|---|
| Example 7 (comparative) | High MW Copolymer | 1/0.1 | 131 |
| Example 8 | High MW Terpolymer | 1/0.1 | 332 |

In Table 7 it is shown that an ASA emulsion prepared with the polymer from Example 8 has smaller median particle size than an emulsion prepared with the polymer from Example 7. As it is shown in Table 8, sizing obtained with ASA emulsified Example 8 is significantly higher than sizing obtained with ASA emulsified with Example 7.

Example 10

A high molecular weight 90/10/5 mole % acrylamide/[2-(methylacryloyloxy)ethyl]trimethylammonium chloride/2,3-dihydroxypropyl methacrylate (AMD/Q6/DHPMA) terpolymer was prepared by a free radical co-polymerization. The polymerization process was carried out by simultaneous, continuous addition of ammonium persulfate and monomer solutions to a reaction vessel that contained deionized water and chelating agent buffered with malic acid. The monomer solution was prepared by mixing 40.93 parts of 52.96% acrylamide solution, 9.93 parts of 75% Q6 solution, 2.87 parts of 100% DHPMA, and 58.66 parts of deionized water. The pH of this solution was adjusted from 4.9 to 4.05 with 0.6 parts of 20% malic acid solution. The monomer solution was sparged with nitrogen for an hour before addition. The reactor vessel solution was prepared by mixing 278.65 parts of deionized water and 0.27 parts of 40% pentasodium diethylenepentaacetate. The pH of the reactor vessel solution was adjusted from 10.15 to 3.80 with 0.38 parts of 20% malic acid solution. The latter solution was sparged with nitrogen for an hour prior to addition.

The initiator solution was prepared by addition of 0.26 parts of ammonium persulfate into 7.99 parts of deionized water. This solution was sparged with nitrogen for half an hour prior to use. The addition of monomer solution and ammonium persulfate solution to the reactor vessel was carried out over 2.25 hr and 2.5 hr, respectively. The polymerization reaction was performed at 65° C. The reaction solution was maintained under the nitrogen purge throughout the course of reaction.

The pH of final product was equal to 3.16, bulk viscosity was equal to 920 cP (measured using Brookfield viscometer model DV-III, #3 spindle, 12 rpm, at 25° C.), and viscosity of a 2% polymer solution was equal to 39 cP (measured using Brookfield viscometer model DV-III, #2 spindle, 30 rpm, at 25° C.).

Example 11

ASA emulsions were prepared with polymers from Examples 7, 8 and 10 at a 1/0.1 ASA/polymer ratio. Concentration of ASA during the emulsification was equal to 7.4 wt. %. ASA emulsions were prepared as it was described in Example 3, except that 7.4 grams of ASA was added to 92.6 g of a 0.8 wt % polymer solution. Handsheets were made and tested as it was described in Example 3.

TABLE 9

ASA Emulsion Particle Size Distribution

| Polymer ID | ASA/Polymer Ratio | ASA Concentration (%) | Median Particle Size (microns) | Percent of Particles Under 1 micron (%) | Size Under Which Are 90% of Particles (micron) |
|---|---|---|---|---|---|
| Example 7 (comparative) | 1/0.1 | 7.4 | 0.909 | 55 | 2.153 |
| Example 8 | 1/0.1 | 7.4 | 0.702 | 66.5 | 1.990 |
| Example 10 | 1/0.1 | 7.4 | 0.714 | 65.7 | 1.942 |

TABLE 10

Sizing Efficiency of ASA Emulsion (Examples 4 and 5)

| Polymer ID | Polymer Description | ASA/Polymer Ratio | Sizing (sec) 3 lb/T ASA |
|---|---|---|---|
| Example 7 (comparative) | High MW Copolymer | 1/0.1 | 206 |
| Example 8 | High MW Terpolymer | 1/0.1 | 349 |
| Example 10 | High MW Terpolymer | 1/0.1 | 327 |

In Table 9 it is shown that ASA emulsions prepared with polymers from Example 8 and 10 have smaller median particle size than the emulsion prepared with the polymer from Example 7. As it is shown in Table 10, sizing obtained with ASA emulsified with polymers from Examples 8 and 10 is significantly higher than sizing obtained with ASA emulsified with the polymer from Example 7.

Although the present invention has been described in detail with reference to certain preferred versions thereof, other variations are possible. Therefore, the spirit and scope of the appended claims should not be limited to the description of the versions contained therein.

What is claimed is:

1. A sizing agent composition comprising:
   a synthetic sizing agent; and
   a cationic polymer obtained by copolymerizing
   (1) a vinyl monomer selected from the group consisting of the formula (I), formula (Ia), and combinations thereof, wherein formula (I) and formula (Ia) are as follows:

$$CH_2=CR_1-COA(CH_2)_nN^+R_2R_3X^- \quad (I)$$

$$(CH_2=CHCH_2)_2N^+(R_2)_2X^- \quad (Ia)$$

wherein $R_1$ is a hydrogen atom or a methyl group, A is an oxygen atom or NH group, n is 2 or 3, $R_2$ and $R_3$ are each a methyl group or an ethyl group and X is a chlorine atom, a bromine atom, or k is a methyl sulfate ion; and
   (2) a vinyl monomer of the formula:

$$CH_2=CR_4-CONH_2 \quad (II)$$

wherein $R_4$ is a hydrogen atom or a methyl group; and (3) a vinyl monomer selected from the group consisting of formula (III), (IIIa), and combinations thereof, wherein formula (III) and (IIIa) are as follows:

$$CH_2\!\!=\!\!CR_5COO(CH_2)_nOH \qquad (III)$$

$$CH_2\!\!=\!\!CR_6COO(CH_2)_mCHOHCH_2OH \qquad (IIIa)$$

wherein $R_5$ and $R_6$ is a hydrogen atom or a methyl group, n is 1-4, inclusive and m is 1 or 2.

2. The sizing agent composition of claim 1, wherein the polymer has a cationic charge of at least 1 to 99 mole %.

3. The sizing agent composition of claim 1, wherein the polymer comprises units derived from 2-hydroxyethyl methacrylate in an amount ranging from 1 to 30 mole percent.

4. The sizing agent composition of claim 1, wherein the polymer has an average molecular weight ranging from 10,000 to 3,000,000 daltons.

5. The sizing agent composition of claim 1, wherein the polymer is crosslinked or branched.

6. A sizing agent composition comprising:
a synthetic sizing agent; and
an amphoteric polymer obtained by copolymerizing
(1) a vinyl monomer of the formula:

$$CH_2\!\!=\!\!CR_1\!\!-\!\!COA(CH_2)_nN^+R_2R_3X^- \qquad (I)$$

and/or $(CH_2\!\!=\!\!CHCH_2)_2N^+(R_2)_2X^-$ (Ia)

wherein $R_1$ is a hydrogen atom or a methyl group, A is an oxygen atom or NH group, n is 2 or 3, $R_2$ and $R_3$ are each a methyl group or an ethyl group and X is a chlorine atom, a bromine atom, or $X^-$ is a methyl sulfate ion; and (2) a vinyl monomer of the formula:

$$CH_2\!\!=\!\!CR_4\!\!-\!\!CONH_2 \qquad (II)$$

wherein $R_4$ is a hydrogen atom or a methyl group, and
(3) a vinyl monomer of the formula:

$$CH_2\!\!=\!\!CR_5COO(CH_2)_nOH \qquad (III)$$

and/or $CH_2\!\!=\!\!CR_6COO(CH_2)_mCHOHCH_2OH$ (IIIa)

wherein $R_5$ and $R_6$ is a hydrogen atom or a methyl group and n is 1 or 4 and m is 1 or 2; and (4) an anionic vinyl monomer of the formula:

$$CH_2\!\!=\!\!CR_7COOR_8 \qquad (IV)$$

wherein $R_7$ is a hydrogen atom or a methyl group, and $R_8$ is a hydrogen atom, an alkali metal, or an ammonium group.

7. The sizing agent composition of claim 6, wherein the polymer has an anionic charge ranging from 0-40 mole percent.

8. A method for making a sizing agent composition comprising:
dispersing a synthetic sizing agent in a cationic polymer formed by copolymerizing
(1) a vinyl monomer of the formula:

$$CH_2\!\!=\!\!CR_1\!\!-\!\!COA(CH_2)_nN^+R_2R_3X^- \qquad (I)$$

and/or $(CH_2\!\!=\!\!CHCH_2)_2N^+(R_2)_2Cl^-$ (Ia)

wherein $R_1$ is a hydrogen atom or a methyl group, A is an oxygen atom or NH group, n is 2 or 3, and $R_2$ and $R_3$ are each a methyl group or an ethyl group; and (2) a vinyl monomer of the formula:

$$CH_2\!\!=\!\!CR_4\!\!-\!\!CONH_2 \qquad (II)$$

wherein $R_4$ is a hydrogen atom or a methyl group; and
(3) a vinyl monomer of the formula:

$$CH_2\!\!=\!\!CR_5COO(CH_2)_nOH \qquad (III)$$

and/or $CH_2\!\!=\!\!CR_6COO(CH_2)_mCHOHCH_2OH$ (IIIa)

wherein $R_5$ and $R_6$ is a hydrogen atom or a methyl group, n is 1-4, inclusive, and m is 1 or 2.

9. A method for making a sizing agent composition comprising:
dispersing a sizing agent in an amphoteric polymer, wherein the amphoteric polymer is formed by copolymerizing
(1) a vinyl monomer of the formula:

$$CH_2\!\!=\!\!CR_1\!\!-\!\!COA(CH_2)_nN^+R_2R_3X^- \qquad (I)$$

and/or $(CH_2\!\!=\!\!CHCH_2)_2N^+(CH_3)_2Cl^-$ (Ia)

wherein $R_1$ is a hydrogen atom or a methyl group, A is an oxygen atom or NH group, n is 2 or 3, and $R_2$ and $R_3$ are each a methyl group or an ethyl group, and X is a chlorine atom, a bromine atom, or $X^-$ is a methyl sulfate ion; and (2) a vinyl monomer of the formula:

$$CH_2\!\!=\!\!CR_4\!\!-\!\!CONH_2 \qquad (II)$$

wherein $R_4$ is a hydrogen atom or a methyl group; and
(3) a vinyl monomer of the formula:

$$CH_2\!\!=\!\!CR_5COO(CH_2)_nOH \qquad (III)$$

and/or $$CH_2\!\!=\!\!CR_6COO(CH_2)_mCHOHCH_2OH \qquad (IIIa)$$

wherein $R_5$ and $R_6$ is a hydrogen atom or a methyl group, n is 1 or 4 and m is 1 or 2.

* * * * *